(12) United States Patent
Shirasagi

(10) Patent No.: US 7,933,186 B2
(45) Date of Patent: Apr. 26, 2011

(54) METHOD FOR MANUFACTURING OPTICAL DISK MASTER, METHOD FOR MANUFACTURING OPTICAL DISK, AND APPARATUS FOR MANUFACTURING OPTICAL DISK MASTER

(75) Inventor: Toshihiko Shirasagi, Shizuoka (JP)

(73) Assignee: Sony Corporation, Tokyo (JP)

( * ) Notice: Subject to any disclaimer, the term of this patent is extended or adjusted under 35 U.S.C. 154(b) by 714 days.

(21) Appl. No.: 11/697,466

(22) Filed: Apr. 6, 2007

(65) Prior Publication Data

US 2007/0238055 A1 Oct. 11, 2007

(30) Foreign Application Priority Data

Apr. 11, 2006 (JP) .................. 2006-108843

(51) Int. Cl.
*G11B 7/00* (2006.01)
*G03F 1/00* (2006.01)

(52) U.S. Cl. ....... 369/100; 369/47.5; 369/116; 430/321; 430/30

(58) Field of Classification Search ................ None
See application file for complete search history.

(56) References Cited

U.S. PATENT DOCUMENTS

| 4,451,914 | A * | 5/1984 | LaBudde et al. ............ 369/121 |
| 7,648,671 | B2 | 1/2010 | Kai et al. |
| 2005/0128926 | A1 | 6/2005 | Kai et al. |

FOREIGN PATENT DOCUMENTS

| JP | 04-356744 | 12/1992 |
| WO | 2004047096 | 6/2004 |
| WO | 2004/047096 | 6/2010 |

OTHER PUBLICATIONS

Japanese Office Action issued on Mar. 30, 2010, for corresponding Japanese Patent Application 2006-108843.

* cited by examiner

*Primary Examiner* — Hoa T Nguyen
*Assistant Examiner* — Mark L Fischer
(74) *Attorney, Agent, or Firm* — K&L Gates LLP

(57) ABSTRACT

A method and apparatus for manufacturing an optical disk master and an optical disk, including measuring the reflectance of laser light at each of a plurality of radius positions by applying the laser light to an optical disk master-forming substrate provided with an inorganic resist layer, the laser light having a non-recording laser power smaller than a recording sensitivity of the inorganic resist layer, producing recording power control data indicating recording laser powers in accordance with the radius positions of the optical disk master-forming substrate by using the reflectances measured, forming an exposure pattern on the inorganic resist layer by applying the laser light to the optical disk master-forming substrate on the basis of the recording power control data while the recording power is varied in accordance with the radius positions, and developing the inorganic resist layer provided with the exposure pattern so as to prepare an uneven pattern.

6 Claims, 7 Drawing Sheets

METHOD FOR MANUFACTURING OPTICAL DISK MASTER, METHOD FOR MANUFACTURING OPTICAL DISK, AND APPARATUS FOR MANUFACTURING OPTICAL DISK MASTER

CROSS REFERENCES TO RELATED APPLICATIONS

The present application claims priority to Japanese Patent Application JP 2006-108843 filed in the Japanese Patent Office on Apr. 11, 2006, the entire contents of which are incorporated herein by reference.

BACKGROUND

The present application relates to a method for manufacturing an optical disk master to be used for manufacturing an optical disk, a method for manufacturing an optical disk, and an apparatus for manufacturing an optical disk master.

In order to produce a playback-only optical disk in which pit strings are formed from so-called emboss pits, in the production process thereof, first, an optical disk master provided with an uneven pattern corresponding to the pit strings are prepared. Subsequently, a stamper is formed from the optical disk master, and optical disks are mass-manufactured by using the stamper.

In a recordable optical disk (a so-called rewritable disk or write-once disk) which is allowed to record and play back the user data by a phase change recording system or a dye change recording system, grooves constituting a recording track is disposed. In order to produce such an optical disk, in the production process thereof, first, an optical disk master provided with an uneven pattern corresponding to the grooves are prepared. Subsequently, a stamper is formed from the optical disk master, and optical disks are mass-manufactured by using the stamper (refer to International Patent Publication WO 2004/047096 Pamphlet).

With respect to a process for producing an optical disk master, a so-called mastering process, in recent years, a mastering technology referred to as phase transition mastering (PTM) by using an inorganic resist has been known.

In PTM, laser light from a semiconductor laser is applied to a master-forming substrate coated with an inorganic resist and, thereby, exposure is performed by thermal recording.

In the mastering process by using the inorganic resist, individual masters (master-forming substrate provided with an inorganic resist layer) have variations in the recording sensitivity. Consequently, a technique, in which an optimum recording laser power is determined by performing test writing through the use of a region other than an actually used for mastering recording, for example, a region outside or inside the exposure pattern recording region on the master-forming substrate, is adopted so as to deal with the variations in the recording sensitivity of the individual master-forming substrates.

However, the master-forming substrate provided with the inorganic resist layer has not only the individual variation, but also variations in the recording sensitivity in a plane, for example, over the inner perimeter to the outer perimeter, on even one master-forming substrate.

In the case where the resist film is an inorganic thermal recording material, in general, the film is formed by a sputtering method, for example. The difference in film quality of the resist film between the inner perimeter and the outer perimeter occurs depending on the material properties of the target material (mixing ratio, sputtering rate of the constituent materials, and manufacturing method) and characteristics of a sputtering apparatus, for example, chamber shape, exhaust performance (properties), TS distance (distance between target and substrate), magnet shape, magnetic field intensity distribution, degree of vacuum, Ar gas flow rate, and film formation pressure. Even when the film thickness is uniform, it is difficult to maintain the in-plane uniformity of the film quality.

The recording sensitivity and the in-plane uniformity of the sensitivity are also varied delicately in accordance with the usage of the target material in use (the amount of the integral of electric power).

In the master preparation of high density disk, e.g., Blue-ray Disc (registered trade mark, produced by Sony Corporation), the above-described variations in the in-plane recording sensitivity exert an influence on the recording characteristics (precision of the pit and the groove) thereof and cause problems.

Even when the in-plane variations are taken into consideration and the recording sensitivity is checked by performing test writing (test recording) outside the exposure pattern recording region, the sensitivity of the entire area to be used for recording may be estimated roughly. Therefore, when a change occurs in the target life or between the inorganic resist masters, the in-plane uniformity (difference between the inner perimeter and the outer perimeter) of the sensitivity may be varied and the signal characteristics to be exposed and recorded may be varied.

That is, when the recording sensitivity over the inner perimeter to the outer perimeter of the master-forming substrate provided with the inorganic resist layer is not uniform, if recording is performed on the entire signal area with a constant power obtained by the check of the recording sensitivity through the use of the test writing at the inner perimeter portion or the outer perimeter portion, differences in the recorded signal characteristic may occur between the inner perimeter and the outer perimeter.

SUMMARY

Accordingly, it is desirable that mastering recording is performed with an appropriate laser power in accordance with variations in recording sensitivity over the inner perimeter to the outer perimeter of a master-forming substrate provided with an inorganic resist layer.

A method for manufacturing an optical disk master according to an embodiment includes the steps of measuring the reflectance of laser light by applying the laser light to each of a plurality of radius positions of an optical disk master-forming substrate provided with an inorganic resist layer, the laser light having a non-recording laser power smaller than a recording sensitivity of the inorganic resist layer, as a reflectance measuring step, producing recording power control data indicating recording laser powers in accordance with the radius positions of the optical disk master-forming substrate by using the reflectances measured at the plurality of radius positions, as a control data producing step, forming an exposure pattern on the above-described inorganic resist layer by applying the laser light to the above-described optical disk master-forming substrate while the recording power is varied in accordance with the radius positions on the basis of the above-described recording power control data, as a recording step, and developing the above-described inorganic resist layer provided with the exposure pattern in the above-described recording step so as to prepare an uneven pattern, as a developing step.

The above-described inorganic resist layer may be a resist layer containing an incomplete oxide of transition metal.

In the above-described reflectance measuring step, the reflectance may be measured at each of a plurality of radius positions in a region, in which the above-described exposure pattern is to be formed, on the above-described optical disk master-forming substrate.

A method for manufacturing an optical disk according to an embodiment includes the processes of forming an inorganic resist layer on an optical disk master-forming substrate, preparing an optical disk master by forming an uneven pattern on the optical disk master-forming substrate provided with the above-described inorganic resist layer, preparing a stamper, to which the uneven pattern on the above-described optical disk master has been transferred, and preparing an optical disk, to which the uneven pattern on the stamper has been transferred, wherein in the above-described optical disk master preparation process, the optical disk master is prepared by the individual steps of the above-described method for manufacturing an optical disk master.

An apparatus for manufacturing an optical disk master according to an embodiment includes a laser output portion in which the laser power of laser light to be output can be varied, a rotation mechanism portion for rotating an optical disk master-forming substrate provided with an inorganic resist layer, a movement mechanism portion for moving radius positions of the above-described optical disk master-forming substrate, at which the laser light is applied to the above-described optical disk master-forming substrate, a reflected light detection portion for detecting the reflected light of the above-described laser light reflected at the above-described optical disk master-forming substrate, and a control portion for performing first processing in which the laser output portion is allowed to apply laser light having a non-recording laser power smaller than the recording sensitivity of the above-described inorganic resist layer to a plurality of radius positions and the reflectances are determined from the amount of reflected light obtained at the above-described reflected light detection portion, the radius positions being changed by the above-described movement mechanism portion, second processing in which recording power control data indicating recording laser powers in accordance with the radius positions of the above-described optical disk master-forming substrate are produced by using the reflectances measured at the above-described plurality of radius positions, and third processing in which the above-described laser output portion is allowed to execute laser output having a recording laser power and the laser power is varied in accordance with the radius position on the basis of the above-described recoding power control data so as to form an exposure pattern on the above-described inorganic resist layer while the above-described optical disk master-forming substrate is rotated by the above-described rotation mechanism portion and the above-described radius positions are moved by the above-described movement mechanism portion.

Furthermore, a focus control mechanism portion for controlling the focus of the above-described laser light applied to the above-described optical disk master-forming substrate on the basis of the information of the reflected light detected by the above-described reflected light detection portion may be included.

In an embodiment, the in-plane sensitivity distribution of the master-forming substrate provided with the inorganic resist layer, in particular, the sensitivity distribution of the recording region to be provided with an exposure pattern (exposure pattern-forming region), is measured in advance. Particularly in this case, the reflectance is measured, while low output laser light is allowed to scan the surface of the recording region of the resist layer, and the state of the sensitivity distribution is determined by using the fact that there is a special correlation between the reflectance and the recording sensitivity of the resist layer. Recording power control data indicating appropriate recording laser powers in accordance with the radius positions based on the sensitivity distribution determined from the detected reflectances are produced. In the actual exposure recording (mastering recording), laser light is applied while the recording power is varied in accordance with the radius positions on the basis of the recording power control data, so that an exposure pattern is formed on the inorganic resist layer.

According to an embodiment, even when in-plane uniformity of the thermal recording sensitivity of the inorganic resist layer is not ensured, mastering recording, which exhibits uniform characteristic all over the inner perimeter to the outer perimeter, may be achieved by performing mastering recording while the laser power is variably controlled in accordance with the recording power control data produced based on the reflectance measurement prior to recording, so that a highly precise optical disk master may be produced.

Furthermore, even when the sensitivity is varied or in-plane uniformity is changed due to variations between the master-forming substrates, between the targets, in the target life, or the like, the recording laser power may be corrected appropriately.

The precision of the pit and the groove of an optical disk produced from them may be improved.

The reflectance measurement is performed by application of laser light having a non-recording laser power smaller than a recording sensitivity, and recording, e.g., test writing, is not performed, so that the state of the master-forming substrate is not changed. Since the recording sensitivity of an actual recording region is detected directly by the reflectance measurement, the uniformity of in-plane recording sensitivity may be detected accurately and the recording laser power may be controlled appropriately.

In the case where the inorganic resist layer is a resist layer containing an incomplete oxide of transition metal, the degree of correlation between the reflectance and the recording sensitivity is high and, therefore, the above-described processing may be performed favorably.

Additional features and advantages are described herein, and will be apparent from, the following Detailed Description and the figures.

DETAILED DESCRIPTION

Various embodiments will be described below including reference to the drawings.

Figure 1:
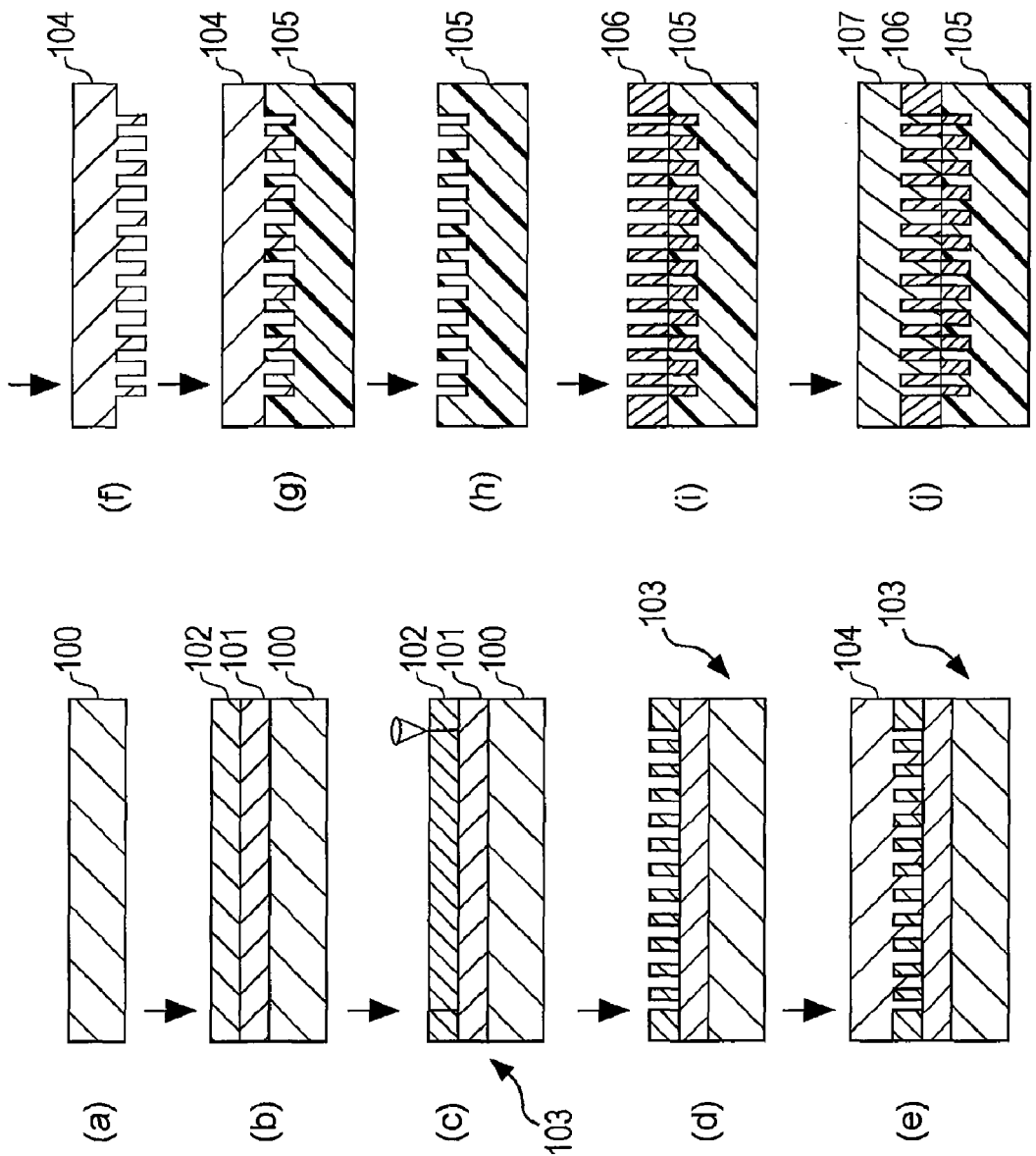
FIG. 1 is an explanatory diagram of an optical disk production process according to an embodiment.

A production process of an optical disk will be described with reference to FIG. 1.

FIG. 1(a) shows a master-forming substrate 100 constituting a disk master. A resist layer 102 composed of an inorganic resist material is formed uniformly on this master-forming substrate 100 by a sputtering method (resist layer forming step, FIG. 1(b)). PTM mastering by using an inorganic resist material is described later as a mastering step of producing the disk master. In this case, an incomplete oxide of transition metal is used as the material for the resist layer 102. Examples of specific transition metals include Ti, V, Cr, Mn, Fe, Nb, Cu, Ni, Co, Mo, Ta, W, Zr, Ru, and Ag.

A predetermined intermediate layer 101 may be formed between the substrate 100 and the resist layer 102 in order to improve the exposure sensitivity of the resist layer 102. FIG. 1(b) shows the state thereof. The film thickness of the resist layer 102 may be set arbitrarily. However, it is preferable that the thickness is within the range of 10 nm to 80 nm.

The resist layer 102 is subjected to exposure in accordance with pit strings or grooves as a signal pattern and is exposed by using a master manufacturing apparatus which is described later (resist layer exposing step, FIG. 1(c)). The resist layer 102 is developed and, thereby, a disk master 103 provided with a predetermined uneven pattern (pit strings or grooves) is prepared (resist layer developing step, FIG. 1(d)).

Subsequently, a metal nickel film is deposited on the uneven pattern surface of the disk master 103 prepared as described above (FIG. 1(e)). This is peeled off the disk master 103 and, thereafter, predetermined working is performed, so that a molding stamper 104, to which the uneven pattern of the disk master 103 has been transferred, is produced (FIG. 1(f)).

A resin disk substrate 105 formed from polycarbonate, which is a thermoplastic resin, is molded by an injection molding method through the use of the resulting stamper 104 (FIG. 1(g)).

The stamper 104 is peeled off (FIG. 1(h)). A reflection film 106 composed of an Ag alloy or the like (FIG. 1(i)) and a protective film 107 having a film thickness of about 0.1 mm are formed on the uneven surface of the resulting resin disk substrate so as to produce an optical disk (FIG. 1(j)). That is, a playback-only disk provided with pit strings or a recordable disk provided with grooves is produced.

In the above-described production process, the resist material applied to the resist layer 102 used for preparation of the disk master 103 is an incomplete oxide of transition metal. Here, the incomplete oxide of transition metal refers to a compound in which the oxygen content is deviated to a smaller side from the content in the stoichiometric composition in accordance with the valence of the transition metal, that is, the incomplete oxide of transition metal is defined as a compound having an oxygen content smaller than the oxygen content in the stoichiometric composition in accordance with the valence of the transition metal.

A chemical formula $MoO_3$ will be described as an example of the oxide of transition metal. With respect to the oxidation state of the chemical formula $MoO_3$, when the state of composition is represented by a composition ratio $Mo_{1-X}O_X$, it can be said that when X is 0.75, the oxide is the complete oxide, and when X is within the range of 0<X<0.75, the oxide is an incomplete oxide in which the oxygen content is smaller than that in the stoichiometric composition.

With respect to some transition metals, one element can form oxides having different valences. In this case, an oxide is assumed to be incomplete oxide when the actual oxygen content is smaller than the content in the stoichiometric composition in accordance with the valence of the transition metal. For example, with respect to Mo, the above-described trivalent oxide ($MoO_3$) is most stable and, in addition, a monovalent oxide (MnO) is also present. In this case, it can be said that when X in the composition ratio $Mo_{1-X}O_X$ is within the range of 0<X<0.5, the oxide is an incomplete oxide in which the oxygen content is smaller than that in the stoichiometric composition. The valence of the transition metal oxide may be analyzed with a commercially available analyzer.

The above-described incomplete oxide of transition metal exhibits absorption of an ultraviolet ray or visible light, and the chemical properties thereof are changed by being irradiated with the ultraviolet ray or visible light. As a result, in spite of being an inorganic resist, a difference in etching rate occurs between an exposed portion and an unexposed potion in the developing step, that is, a so-called selection ratio is ensured. In the resist material composed of an incomplete oxide of transition metal, the fine particle size of the film material is small and, therefore, the pattern at a boundary between the exposed portion and the unexposed potion becomes clear, so that the resolution can be increased.

With respect to the incomplete oxide of transition metal, since the properties for serving as a resist material are varied depending on the degree of oxidation, an optimum degree of oxidation is selected appropriately. For example, an incomplete oxide, in which the oxygen content is significantly smaller than that in the stoichiometric composition of the complete oxide of transition metal, may cause inconveniencies of requiring a large irradiation power in the exposing step, requiring a long time for the developing treatment, and the like. Therefore, it is preferable that the incomplete oxide has an oxygen content slightly smaller than that in the stoichiometric composition of the complete oxide of transition metal.

As described above, examples of specific transition metals constituting the resist material include Ti, V, Cr, Mn, Fe, Nb, Cu, Ni, Co, Mo, Ta, W, Zr, Ru, and Ag. Among them, preferably, Mo, W, Cr, Fe, and Nb are used. In particular, it is preferable to use Mo and W from the view point that a large chemical change is obtained by an ultraviolet ray or visible light.

In the above-described optical disk production process, the disk master 103 is produced, as described below, in the master preparation step (mastering step) shown in FIG. 1(c) and FIG. 1(d) of the present embodiment.

In the mastering step of the present embodiment, the PTM system is used in the master manufacturing apparatus, as described later.

The PTM system will be described below briefly.

In the production of disks of, for example, a compact disc (CD) system and a digital versatile disc (DVD) system, first, a disk master coated with a photoresist is prepared. By using a mastering apparatus (master manufacturing apparatus), laser light is applied to the disk master from a light source, e.g., a gas laser, so as to form an exposure pattern in accordance with pits. In this case, the laser light from the laser light source, which is a continuous-wave laser, is light-intensity-modulated with, for example, an acousto-optical modulator (AOM), the intensity-modulated laser light is lead to the disk master by an optical system so as to expose. That is, a pit modulation signal, e.g., a non return to zero (NRZ) modulation signal, is given to the AOM, the laser light is subjected to intensity modulation corresponding to a pit pattern with this AOM and, thereby, merely pit portions on the master are exposed.

Figure 7:
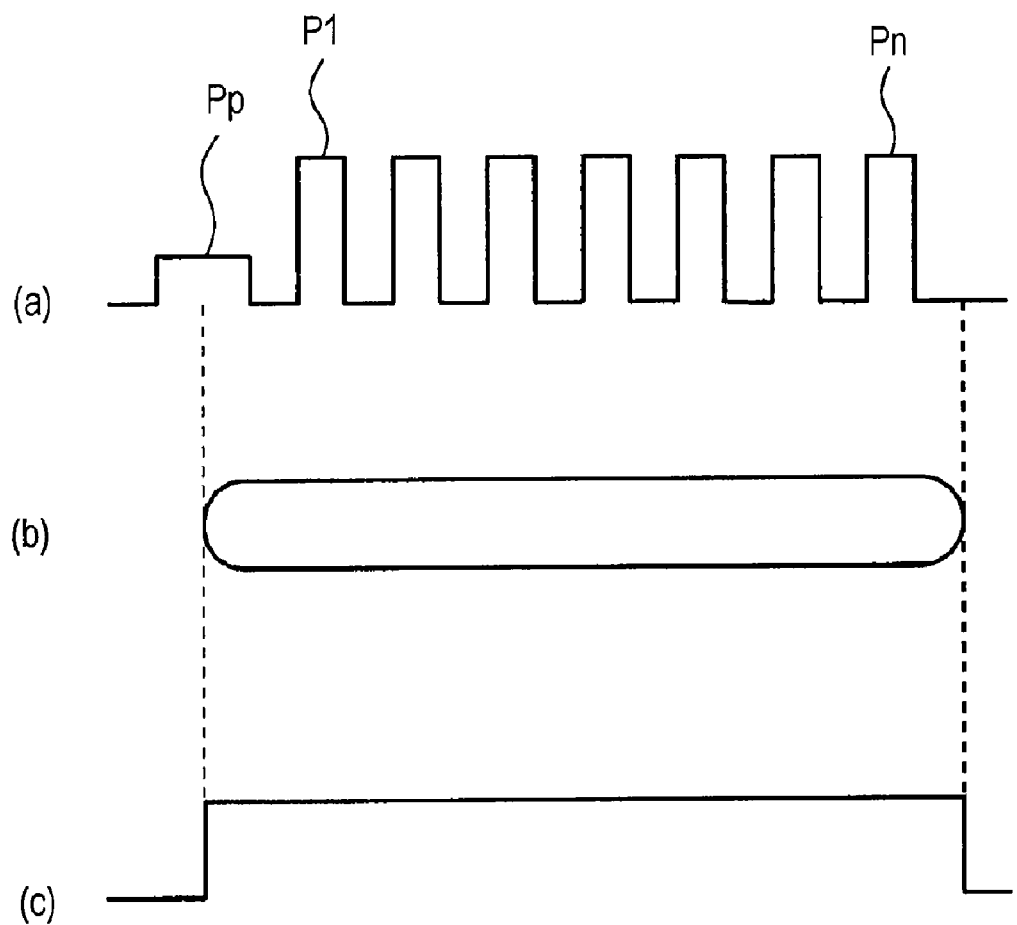
FIG. 7 is an explanatory diagram of a PTM system.

For example, FIG. 7(c) shows one pit shape, and the laser emission intensity modulated with the AOM becomes as shown in FIG. 7(c). Since the exposure of the photoresist on the master is so-called optical recording, the portion exposed with the laser, as shown in FIG. 7, becomes a pit just as it is.

On the other hand, in the PTM system, a disk master coated with an inorganic resist is irradiated with laser light from a semiconductor laser, so as to perform exposure as thermal recording.

In this case, in order to suppress the accumulation of heat due to laser application and equalize the pit width, usually, exposure is performed with the pulsed light, as shown in FIG. 7(a). In this case, in general, a NRZ modulation signal synchronized with a clock is converted to a pulsed signal with a time interval smaller than a clock period in accordance with the length of the H level thereof, and an electric power is supplied to a semiconductor laser capable of being modulated directly in synchronization with the converted pulsed modulation signal. In this manner, a laser output is performed as pulsed emission Pp for preheating and pulsed emission P1 to Pn for heating in accordance with the pit length.

Figure 2:
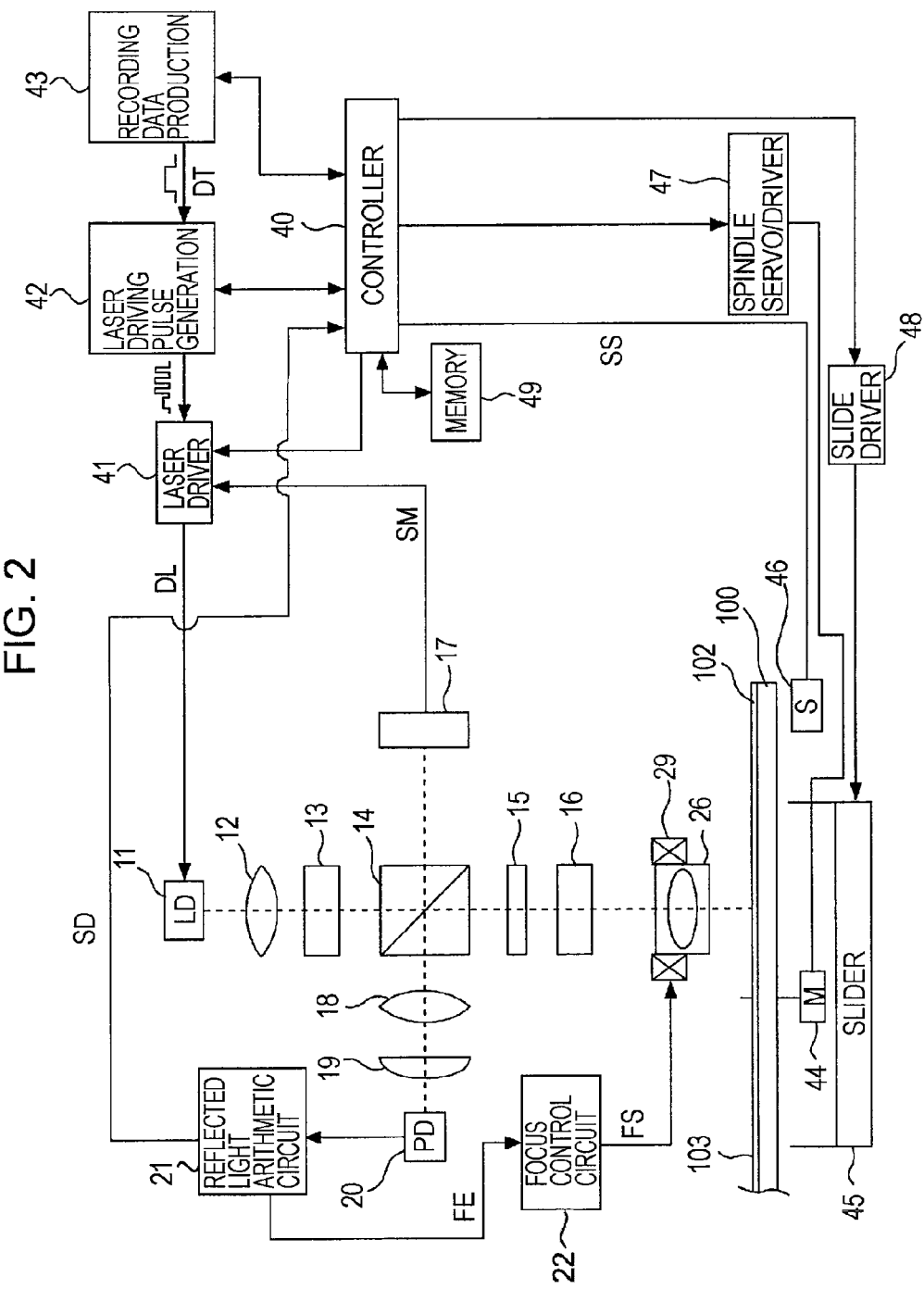
FIG. 2 is a block diagram of a master manufacturing apparatus according to an embodiment.

In the present embodiment, mastering is performed by this PTM system. FIG. 2 shows a configuration example of the master manufacturing apparatus of the present embodiment in which the mastering is performed by the PTM system. In this master manufacturing apparatus, exposure of a pit pattern or a groove pattern is performed by thermal recording operation through laser application to a disk master 103 coated with an inorganic resist, as described above.

In the example described below, an uneven pattern is formed as pit strings.

A laser light source 11 serving as a semiconductor laser outputs laser light with a wavelength of 405 nm, for example. A laser driving signal DL, which is a NRZ modulation signal, e.g., RLL(1-7)pp, converted to a pulsed modulation signal, as shown in FIG. 7(a), is supplied to this laser light source 11, and the light is emitted on the basis of this laser driving signal DL.

The laser light emitted from the laser light source 11 is allowed to become parallel light by a collimator lens 12. Thereafter, a spot shape is deformed into the shape of, for example, a circle, by an anamorphic prism 13, and the laser light is lead to a polarization beam splitter 14.

The polarized component passed through the polarization beam splitter 14 is lead to an objective lens 26 through a λ/4 plate 15, and a beam expander 16, and the light is collected by this objective lens 26 so as to be applied to a disk master 103 (a master-forming substrate 100 provided with an inorganic resist layer 102).

At this time, the laser light from the laser light source 11 with a wavelength of 405 nm is applied to the disk master 103 through the objective lens 26, as described above, and comes into a focus on the disk master 103. The disk master 103 is produced by forming a film of inorganic resist composed of a metal oxide on a silicon wafer, and a portion particularly in the neighborhood of the center heated to high temperatures by absorbing a laser beam of 405 nm becomes polycrystalline.

That is, an exposure pattern as pit strings is formed on the disk master 103 through thermal recording by the laser light spot collected with the objective lens 26.

As is described with reference to FIG. 1(d), the exposed disk master 103 is developed with an alkaline developing solution, e.g., NMD3, and thereby, merely exposed portions are eluted, so that an uneven pattern in a predetermined pit shape is formed.

The polarized component reflected at the polarization beam splitter 14 is applied to a monitor detector 17 (a photodetector for monitoring the laser power). The monitor detector 17 outputs a light intensity monitor signal SM in accordance with the level of the amount of the received light (light intensity).

On the other hand, the return light of the laser light applied to the disk master 103 passes the objective lens 26, the beam expander 16, and the λ/4 plate 15 and reaches the polarization beam splitter 14. In this case, since the light passes the λ/4 plate 15 twice, go and return, the plane of polarization is rotated 90 degrees and, thereby, the return light is reflected at the polarization beam splitter 14. The return light reflected at the polarization beam splitter 14 is received by a light-receiving surface of a photodetector 20 through a condenser lens 18 and a cylindrical lens 19.

The light-receiving surface of the photodetector 20 is provided with, for example, a four-divided light-receiving surface and, therefore, a focus error signal based on the astigmatism can be obtained.

Each light-receiving surface of the photodetector 20 outputs a current signal in accordance with the amount of received light so as to supply to a reflected light arithmetic circuit 21.

The reflected light arithmetic circuit 21 converts the current signal from each of the four-divided light receiving surface to the voltage signal and, in addition, performs arithmetic processing as an astigmatic method so as to produce a focus error signal FE. The resulting focus error signal FE is supplied to a focus control circuit 22.

The focus control circuit 22 produces a servo driving signal FS of an actuator 29 holding the objective lens 26, while the movement in the focus direction is possible, on the basis of the focus error signal FE. Subsequently, the actuator 29 drives the objective lens 26 in a direction increasing or decreasing proximity to the master 103 on the basis of the servo driving signal FS, so that the focus servo is carried out.

The reflected light arithmetic circuit 21 sums the voltage signal of the amount of received light of each of the four-divided light receiving surface, produce a reflected-light amount detection signal SD indicating the level of the reflected light, and supply this to a controller 40.

The laser driving signal DL to the laser light source 11 is produced by a recording data production portion 43, a laser driving pulse generation portion 42, and a laser driver 41.

The recording data production portion 43 outputs data DT to be recorded as a pit exposure pattern on the disk master 103. For example, data of picture signals, sound signals, physical information, management information, and the like are output as main data.

The data DT are supplied to the laser driving pulse generation portion 42. The laser driving pulse generation portion 42 produces a laser driving pulse, on the basis of the data DT, for actually driving the laser light source 11 to perform pulsed emission. That is, as shown in FIG. 7(a), a pulse waveform is produced in accordance with the pit length to be formed in such a way that laser emission is performed with the timing and the light intensity suitable for the pulsed emission Pp for preheating and pulsed emission P1 to Pn.

This laser driving pulse is supplied to the laser driver 41. The laser driver 41 applies a driving current to a semiconductor laser serving as the laser light source 11 on the basis of the laser driving pulse. In this manner, pulsed emission of the laser is performed with the emission intensity in accordance with the laser driving pulse.

The light intensity monitor signal SM obtained from the monitor detector 17 is supplied to the laser driver 41. The laser driver 41 compares the light intensity monitor signal SM with the reference value and, thereby, performs control to keep the laser emission intensity at a predetermined level.

The laser driver 41 is allowed to vary the laser power at an interval of 0.01 mW, for example.

The disk master 103 is driven to rotate by a spindle motor 44. The spindle motor 44 is driven to rotate by a spindle servo/driver 47 while the rotation speed is controlled. In this manner, the disk master 103 is rotated at a constant linear velocity.

The slider 45 is driven by a slide driver 48, and moves an entire base which includes a spindle mechanism and on which the disk master 103 is mounted. That is, the disk master 103 in the state of being rotated by the spindle motor 44 is exposed with the above-described optical system while being moved by the slider 45 in the radius direction and, thereby, a track composed of the exposed pit string is formed into the shape of a spiral.

The movement position by the slider 45, that is, the exposure position of the disk master 103 (disk radius position) is detected with a sensor 46. The position detection information SS by the sensor 46 is supplied to a controller 40.

The controller 40 controls the entire master manufacturing apparatus. That is, the controller 40 performs a direction of data generation operation from a recording data production portion 43, control of processing in the laser driving pulse generation portion 42, setting of a laser power for the laser driver 41, control of spindle rotation operation by the spindle servo/driver 47, control of movement operation of the slider 45 by the slide driver 48, and the like.

Memory 49 is used for storing program cords to be executed in the controller 40 or temporarily holding operation data during execution. The memory 49 shown in FIG. 2 includes nonvolatile memory, e.g., read only memory (ROM) for storing programs, random access memory (RAM) for computation work region and various temporary memory, and electrically erasable and programmable read only memory (EEP-ROM).

Figure 3:
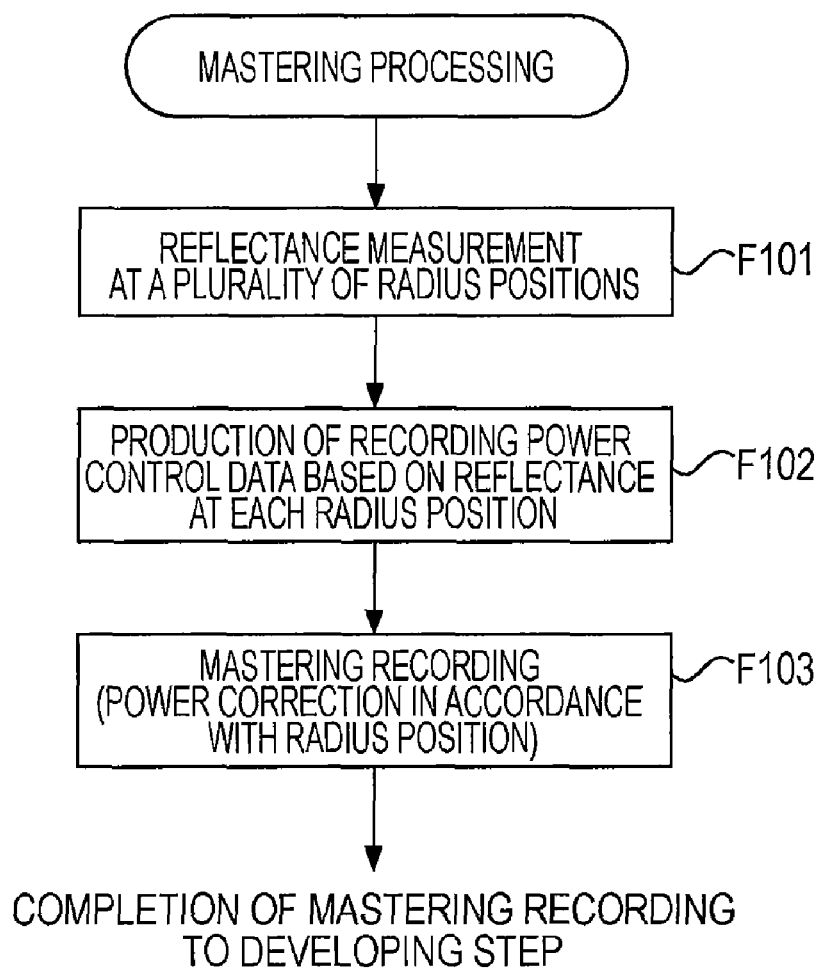
FIG. 3 is a flowchart of mastering processing according to an embodiment.

When mastering recording is performed on the disk master 103 (the master-forming substrate 100 provided with the inorganic resist layer 102) by this master manufacturing apparatus, the controller 40 performs control processing of steps F101, F102, and F103 as shown in FIG. 3 and, thereby, mastering is carried out.

The processing, in which a pit pattern is exposed on the disk master 103, as mastering recording, will be described.

In the step F101, the controller 40 performs processing of measuring the reflectances at a plurality of radius positions on the disk master 103 (the master-forming substrate 100 provided with the inorganic resist layer 102).

That is, the amounts of reflected light as the return light of the laser light are detected at a plurality of radius positions of the disk master 103 mounted on the master manufacturing apparatus, so as to measure the reflectances. For example, the reflectance is measured at each of the radius positions of radii 15 mm, 20 mm, 25 mm, 30 mm, 35 mm, 40 mm, 45 mm, 50 mm, 55 mm, and 60 mm, as the plurality of radius positions.

In this case, the controller 40 controls the laser driver 41 in such a way that the semiconductor laser 11 is allowed to continuously emit laser light with the laser power at a level lower than the recording sensitivity of the resist layer 102. For example, it is assumed that the exposure as thermal recording of the resist layer 102 is performed when the laser power is 8 mW or more. The laser power at a level lower than the recording sensitivity of the resist layer 102 is a laser power lower than 8 mW. In general, 9 to 10 mW is used as the laser power at a recording level, and about 0.5 mW is used as the laser power at a playback level. In this case, the controller 40 may control in such a way that the laser output is performed with, for example, 0.5 mW as the laser power at the playback level.

The laser light, which is output from the laser light source 11, at the playback level is applied to the disk master 103 while being in-focus state by the above-described focus control.

The controller 40 controls the slide driver 48 in such a way that the irradiation position of the laser light on the disk master 103 becomes a radius position of 15 mm. In that state, when the laser power at the playback level is applied, the amount of reflected light is detected by the photodetector 20 and the reflected light arithmetic circuit 21, and the reflected-light amount detection signal SD is supplied. The controller 40 may calculate the reflectance at the radius position of 15 mm from the laser power 0.5 mW and the value of the reflected-light amount detection signal SD.

Likewise, the controller 40 measures the reflectance from the reflected-light amount detection signal SD detected in the state in which the irradiation position of the laser light on the disk master 103 is set at a radius position of 20 mm. The above-described operation is executed at each of the above-described radius positions and, thereby, the reflectance at each of the radius positions is measured.

Specifically, the controller 40 allows the laser power output at the playback level to be continuously executed. In addition, for example, the position detection information SS of the sensor 46 may be monitored while the slider 45 is moved from an inner perimeter side radius position toward the outer perimeter side, the reflected-light amount detection signal SD may be taken in when a predetermined radius position is reached and, thereby, the reflectance may be determined.

Figure 5:
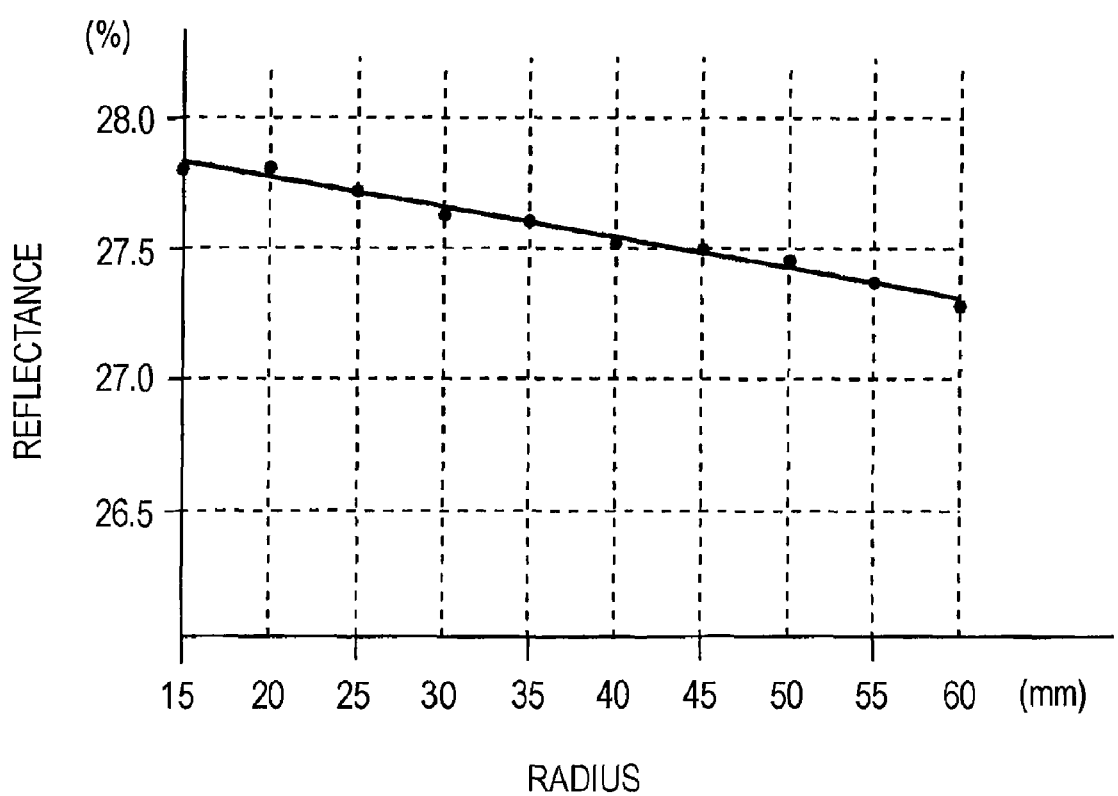
FIG. 5 is an explanatory diagram of an example of the reflectance measurement results according to an embodiment.

FIG. 5 shows an example of the measurement results of the reflectance at each of the above-described radius positions. The controller 40 stores the information of the reflectance measured at each of the radius position, as described above, into the memory 49.

In the measurement of the reflectance, the above-described radius positions are no more than examples. The reflectances may be measured at a smaller interval and at many radius positions, or the reflectances may be measured at radius positions having a larger interval. That is, the setting of the radius position points, at which the reflectance is measured, are not limited.

In the reflectance measurement, the spindle motor 44 may be rotated or may not be rotated. When the spindle motor 44 is rotated, the number of revolutions is also determined at will.

In the step F102, the controller 40 produces recording power control data based on the reflectance measured at each radius position.

The thermal recording sensitivity profile, on a radius basis, of the entire recording area on the disk master 103 (a master-forming substrate 100 provided with an inorganic resist layer 102) is grasped from the reflectance and correlation data between the reflectance and the thermal recording sensitivity prepared in advance, and thereby, the recording power control data indicating the recording power on a radius basis in the exposure recording.

Figure 4:
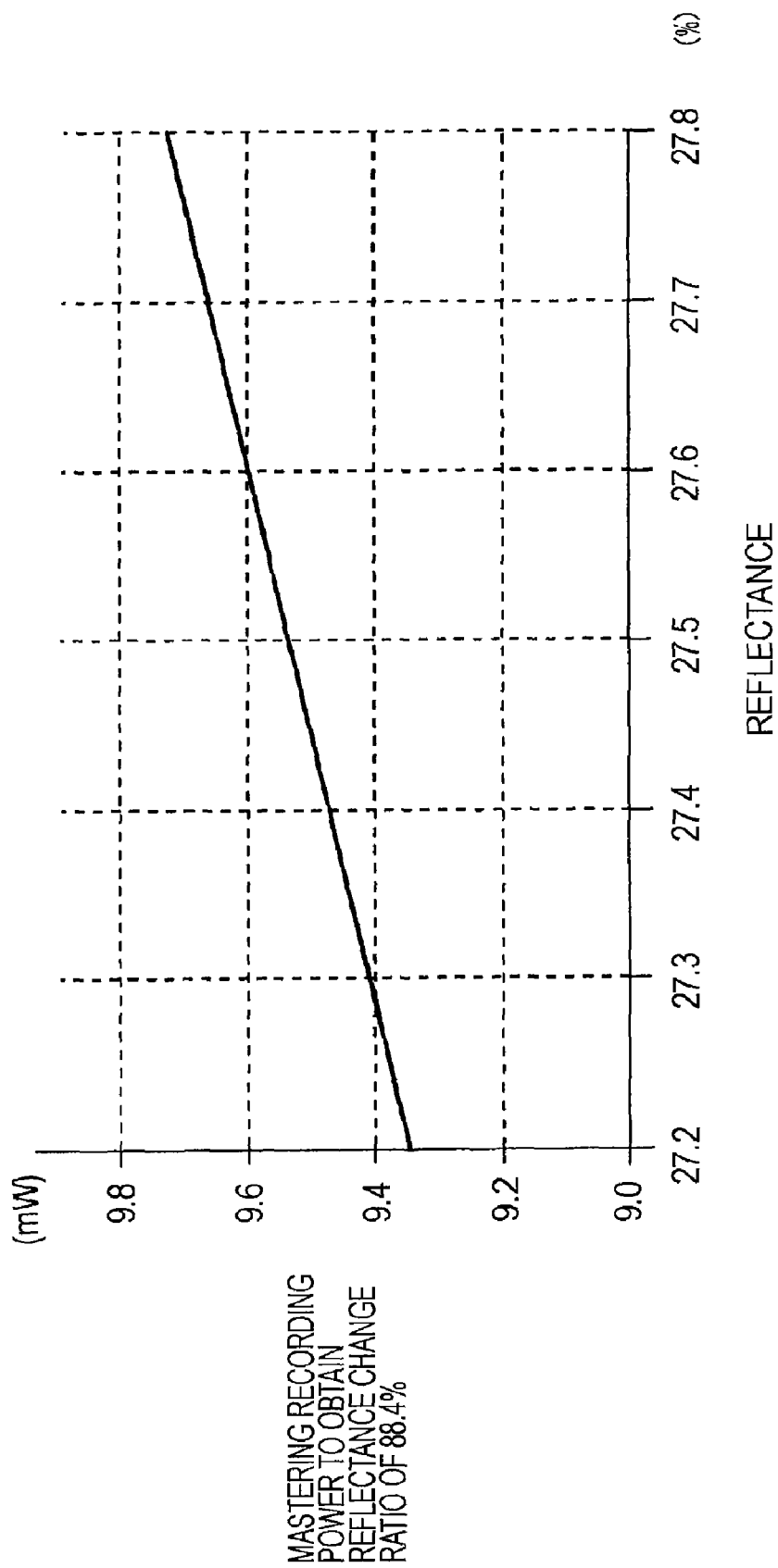
FIG. 4 is an explanatory diagram of correlation data between the reflectance and the thermal recording sensitivity according to an embodiment.

FIG. 4 shows the correlation data between the reflectance and the thermal recording sensitivity of the disk master 103 provided with the inorganic resist layer. For example, this correlation data are stored in the memory 49, and the controller 40 performs calculation with reference to the correlation data.

The correlation data indicate the relationship between the reflectance and the recording power to obtain a reflectance change ratio of 88.4%.

The reflectance change ratio is the value indicating the degree of change of reflectance due to the mastering recording, and is represented by (reflectance after recording)/(reflectance before recording). With respect to the reflectance change ratio, 88.4% is an example of an optimum value.

For example, it is indicated that in the case where the reflectance is 27.6%, when the recording laser power is set at 9.6 mW, the recording exhibiting a reflectance change ratio of 88.4% can be performed. It is clear from this correlation data that as the reflectance is decreased, the recording layer (inorganic resist layer 102) exhibits good sensitivity and, therefore, an appropriate recording can be performed at a low laser power.

As is clear from the correlation data, in the case where the disk master 103 is provided with the inorganic resist layer 102, the reflectance is nearly proportionate to the thermal recording sensitivity. In particular, it is ascertained that when the inorganic resist layer 102 is the resist layer containing an incomplete oxide of transition metal, this proportionality between the reflectance and the thermal recording sensitivity is ensured.

From the correlation data and the measurement results of reflectance as shown in FIG. 5, a favorable recording laser power at each radius position may be calculated. For example, according to the measurement results shown in FIG. 5, the reflectance at the radius position of 45 mm is 27.5%. When the reflectance is 27.5%, as is clear from the correlation data shown in FIG. 4, the recording laser power to obtain a reflectance change ratio of 88.4% is about 9.55 mW. That is, it is clear that in the portion at a radius position of 45 mm of the disk master 103, mastering recording is favorably performed with a recording laser power of 9.55 mW.

Figure 6:
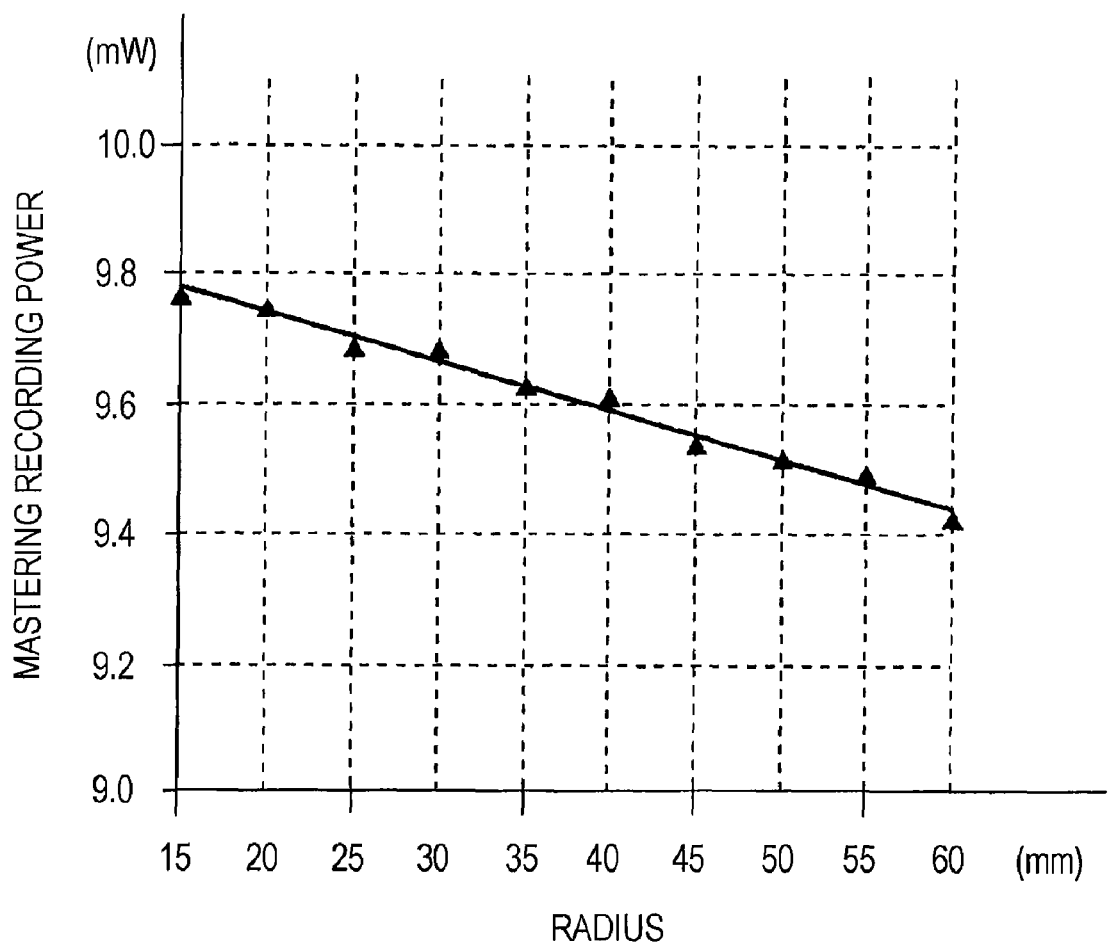
FIG. 6 is an explanatory diagram of recording power control data according to an embodiment.

The above-described calculation is performed for each radius position, and the recording laser power to obtain a reflectance change ratio of 88.4% is calculated in the entire region. The results are shown in FIG. 6. That is, a recording laser power suitable for each of the radius position is determined.

The data corresponding to the relationship shown in FIG. 6 are the recording power control data to be determined by the controller 40. The controller 40 calculates the recording power control data in the step F102, and stores into the memory 49.

In the step F103, the controller 40 controls the execution of an actual mastering recording operation. That is, the controller 40 controls in such a way that the spindle motor 44 is rotated at a predetermined linear velocity, and the slider 45 is moved gradually from an innermost position toward the outer perimeter. The recording data production portion 43 is allowed to produce the recording data DT, and the laser driver 41 is allowed to execute output of the laser light as a recording power.

In this manner, a spiral pit string pattern is exposed from the inner perimeter side on the disk master 103.

At this time, the controller 40 controls the laser power of the laser driver 41 variably while monitoring the position detection information of the sensor 46. That is, the recording laser power is varied in accordance with the radius positions on the basis of the recording power control data, as shown in FIG. 6.

When the above-described mastering recording operation is performed, exposure recording under the condition, in which the reflection change ratio is 88.4%, is executed from the inner perimeter side toward the outer perimeter side of the disk master 103.

Since the measurement of reflectance in the step F101 is performed at radius positions, for example, at an interval of 5 mm, as described above, an appropriate recording laser power is determined on a radius position at an interval of 5 mm basis by using the measurement values. For example, the recording laser powers indicated by black triangles shown in FIG. 6 are calculated as the recording power control data. In this case, the laser power may be varied every 5 mm intervals of radius positions. However, it is favorable that the laser power is varied more frequently to become close to the linear line shown in FIG. 6. For example, in the case where the laser power can be variably controlled with a resolution of 0.01 mW, the laser power may also be frequently variably controlled with that resolution at some midpoints of the radius positions which have been sample points (at some midpoints of the interval of 5 mm).

When the mastering recording is completed by performing the above-described processing, the resulting disk master 103 is subjected to the developing treatment described with reference to FIG. 1(d) and, thereby, the disk master 103 is completed.

In the above-described present embodiment, when the disk master 103 is produced, laser light irradiation with a non-recording laser power (playback power) smaller than the recording sensitivity of the inorganic resist layer 102 is performed at each of a plurality of radius positions of the master-forming substrate 100 provided with the inorganic resist layer 102, and the reflectance of the laser light is measured.

The recording power control data indicating the recording power in accordance with the radius positions of the master-forming substrate 100 are produced by using the reflectances measured at a plurality of radius positions.

The exposure pattern is formed on the inorganic resist layer 102 by applying the laser light to the master-forming substrate 100 while the recording power is varied in accordance with the radius positions on the basis of the recording power control data.

After the above-described mastering recording is performed, the developing treatment of the inorganic resist layer 102 provided with the exposure pattern is performed, so that the disk master 103 provided with an uneven pattern as pit strings is completed.

According to the master manufacturing method of the present embodiment, even when in-plane uniformity of the thermal recording sensitivity of the inorganic resist layer 102 is not ensured, mastering recording, which exhibits uniform characteristic all over the inner perimeter to the outer perimeter, may be achieved, so that a highly precise disk master 103 may be produced.

Furthermore, even when the sensitivity is varied or in-plane uniformity is changed due to variations between the master-forming substrates, between the targets, in the target life, or the like, the recording laser power may be corrected appropriately.

Consequently, the precision of the pit of an optical disk produced from them may be improved.

The reflectance measurement is performed by application of laser light having a non-recording laser power smaller than a recording sensitivity, and recording, e.g., test writing, is not performed. Therefore, the state of the master-forming substrate 100 (inorganic resist layer 102) is not changed. This refers to that the recording sensitivity of an actual recording region is detected directly, the uniformity of in-plane recording sensitivity may be detected accurately, and the recording laser power may be controlled appropriately.

The reflectance is measured prior to the recording with the recording laser power so as to determine an appropriate recording laser power at each radius position. Therefore, the laser power can be variably controlled with an appropriate timing without delay.

For example, the measurement of reflectance of each radius position may also be performed simultaneously with the recording. That is, in the operation, the exposure recording with the recording laser power is performed, the level of the reflected light thereof is detected at the same time, an appropriate recording laser power is calculated in accordance with the reflected light, and the recording laser power is varied. However, in this case, the laser power is varied by so-called feedback control. Therefore, correction of the laser power may be delayed due to a time lag resulting from a series of operations of detection of the reflected light, calculation of an appropriate laser power, and change of the laser power. When an appropriate laser power on a radius position basis is determined in advance, as in the present embodiment, such delay may be avoided.

The master manufacturing apparatus for executing operations following the above-described processing shown in FIG. 3 may not have a particularly complicated configuration. The master manufacturing apparatus of the present embodiment may be realized easily by performing the control shown in FIG. 3 on the basis of the software program of the controller 40.

The above-described master manufacturing apparatus shown in FIG. 2 has been described as the master manufacturing apparatus of the disk master 103 having the uneven pattern of pit strings, that is, the disk master 103 to be used for manufacturing the playback-only disk. However, the operations shown in FIG. 3 may also be applied to a master manufacturing apparatus for producing the disk master 103 for manufacturing a write-once disk or a rewritable disk.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for manufacturing an optical disk master, the optical disk master comprising an optical disk master-forming substrate provided with an inorganic resist layer, the method comprising:
    applying a laser light to each of a plurality of radius positions in a region of the optical disk master-forming substrate provided with the inorganic resist layer, the laser light having a non-recording laser power smaller than a recording sensitivity of the inorganic resist layer, the plurality of radius positions each being located at a designated distance from the center of the optical disk master-forming substrate;
    measuring at a prescribed interval a reflectance of the laser light applied to each of the plurality of radius positions;
    storing, for each of the plurality of radius positions, information indicative of the designated distance from the center of the optical disk master-forming substrate and the reflectance of the laser light at the designated distance;
    producing recording power control data determined for each of the plurality of radius positions at the prescribed interval, the recording power control data indicative of appropriate recording laser powers greater than the recording sensitivity of the inorganic resist layer, the recording power control data based on
        the designated distance from the center of the optical disk master-forming substrate and the reflectance of the laser light at the designated distance, the recording laser powers varying between at least a first radius position and a second radius position based on the reflectance of the laser light at the designated distance of the first radius position and the reflectance of the laser light at the designated distance of the second radius position, and
        predetermined correlation data between reflectance and thermal recording sensitivity of the optical disk master;
    after producing the recording power control data, forming an exposure pattern on the inorganic resist layer by applying the laser light to the optical disk master-forming substrate with the varying recording laser powers of the recording power control data; and
    developing the inorganic resist layer provided with the exposure pattern to prepare an uneven pattern.

2. The method for manufacturing an optical disk master according to claim 1, wherein the inorganic resist layer is a resist layer containing an incomplete oxide of transition metal.

3. The method for manufacturing an optical disk master according to claim 1, wherein the reflectance of the laser light applied to each of the plurality of radius positions is measured with a photodetector.

4. A method for manufacturing an optical disk comprising the processes of:
    forming an inorganic resist layer on an optical disk master-forming substrate;
    preparing an optical disk master by forming an uneven pattern on the optical disk master-forming substrate provided with the inorganic resist layer;
    preparing a stamper, to which the uneven pattern on the optical disk master has been transferred; and
    preparing an optical disk, to which the uneven pattern on the stamper has been transferred,
    wherein the optical disk master preparation process includes:
    applying a laser light to each of a plurality of radius positions in a region of the optical disk master-forming substrate with the inorganic resist layer, the laser light having a non-recording laser power smaller than a recording sensitivity of the inorganic resist layer, the plurality of radius positions each being located at a designated distance from the center of the optical disk master-forming substrate;
    measuring at a prescribed interval a reflectance of the laser light applied to each of the plurality of radius positions;
    storing, for each of the plurality of radius positions, information indicative of the designated distance from the center of the optical disk master-forming substrate and the reflectance of the laser light at the designated distance;
    producing recording power control data determined for each of the plurality of radius positions at the prescribed interval, the recording power control data indicative of appropriate recording laser powers greater than the recording sensitivity of the inorganic resist layer, the recording power control data based on
        the designated distance from the center of the optical disk master-forming substrate and the reflectance of the laser light at the designated distance, the recording laser powers varying between at least a first radius position and a second radius position based on the reflectance of the laser light at the designated distance of the first radius position and the reflectance of the laser light at the designated distance of the second radius position, and predetermined correlation data between reflectance and thermal recording sensitivity of the optical disk master;

after producing the recording power control data, forming an exposure pattern on the inorganic resist layer by applying the laser light to the optical disk master-forming substrate with the varying recording laser powers of the recording power control data; and developing the inorganic resist layer provided with the exposure pattern to prepare an uneven pattern.

5. An apparatus for manufacturing an optical disk master, the optical disk master comprising an optical disk master-forming substrate provided with an inorganic resist layer, the apparatus comprising:

a laser output portion in which a laser power of laser light to be output can be varied;

a rotation mechanism portion for rotating the optical disk master-forming substrate provided with the inorganic resist layer;

a movement mechanism portion for moving radius positions of the optical disk master-forming substrate, at which the laser light is applied to the optical disk master-forming substrate;

a reflected light detection portion for detecting the reflected light of the laser light reflected at the optical disk master-forming substrate; and a control portion for performing:

first processing in which the laser output portion is controlled to apply the laser light having a non-recording laser power smaller than the recording sensitivity of the inorganic resist layer to a plurality of radius positions in a region, each being located at a designated distance from the center of the optical disk master-forming substrate and at a prescribed interval a reflectance of the laser light applied to each of the plurality of radius positions is determined from an amount of reflected light obtained at the reflected light detection portion, the radius positions being changed by the movement mechanism portion, second processing in which recording power control data for each of the plurality of radius positions is determined at the prescribed interval, indicating appropriate recording laser powers greater than the recording sensitivity of the inorganic resist layer and based on the designated distance from the center of the optical disk master-forming substrate and the reflectance of the laser light at the designated distance, the recording laser powers varying between at least a first radius position and a second radius position based on the reflectance of the laser light at the designated distance of the first radius position and the reflectance of the laser light at the designated distance of the second radius position, and predetermined correlation data between reflectance and thermal recording sensitivity of the optical disk master, and third processing performed after producing the recording power control data in which the laser output portion is controlled to execute the varying recording laser powers of the recording power control data to form an exposure pattern on the inorganic resist layer while the optical disk master-forming substrate is rotated by the rotation mechanism portion and the radius positions are moved by the movement mechanism portion.

6. The apparatus for manufacturing an optical disk master according to claim 5, further comprising a focus control mechanism portion for controlling the focus of the laser light applied to the optical disk master-forming substrate on the basis of the recording power control data.

* * * * *